United States Patent [19]

Vinciguerra

[11] Patent Number: 4,770,584

[45] Date of Patent: Sep. 13, 1988

[54] DEMOUNTABLE PIN, PARTICULARLY SUITABLE FOR THE LEVER MECHANISMS OF TEXTILE MACHINES

[75] Inventor: Costantino Vinciguerra, Florence, Italy

[73] Assignee: Nuovopignone Industrie Meccaniche e Fonderia S.p.A., Florence, Italy

[21] Appl. No.: 28,207

[22] Filed: Mar. 20, 1987

[30] Foreign Application Priority Data

Mar. 27, 1986 [IT] Italy .................................. 19896 A/86

[51] Int. Cl.$^4$ ........................ F16B 35/00; F16B 37/00
[52] U.S. Cl. .................................. 411/366; 411/186; 411/389; 411/427
[58] Field of Search ............... 411/186, 338, 339, 344, 411/389, 366, 395, 397, 427, 537, 189

[56] References Cited

U.S. PATENT DOCUMENTS

| | | | |
|---|---|---|---|
| 1,743,946 | 1/1930 | Williams | 411/427 |
| 2,435,466 | 2/1948 | Thomas | 411/389 |
| 3,056,443 | 10/1962 | Knocke | 411/186 |
| 3,424,212 | 1/1969 | Kemper | 411/395 |
| 3,943,818 | 3/1976 | Pryor et al. | 411/389 |
| 4,169,630 | 10/1979 | Wagner | 411/427 |
| 4,295,765 | 10/1981 | Burke | 411/366 |

FOREIGN PATENT DOCUMENTS 244327 3/1963 Australia ........................... 411/339

Primary Examiner—Neill R. Wilson
Attorney, Agent, or Firm—Stevens, Davis, Miller & Mosher

[57] ABSTRACT

A self-locking demountable pin consisting of a central stay bolt with an internal hexagonal through bore for its tightening by a key and comprising at its two ends two opposite-handed external threads, right handed and left handed respectively, which cooperate with the corresponding threads of two elastic end nuts each provided with an annular flange having a frusto-conical surface and decreasing in thickness in an outward direction, its taper being greater than that of two frusto-conical flares into which the nuts are to be inserted.

3 Claims, 2 Drawing Sheets

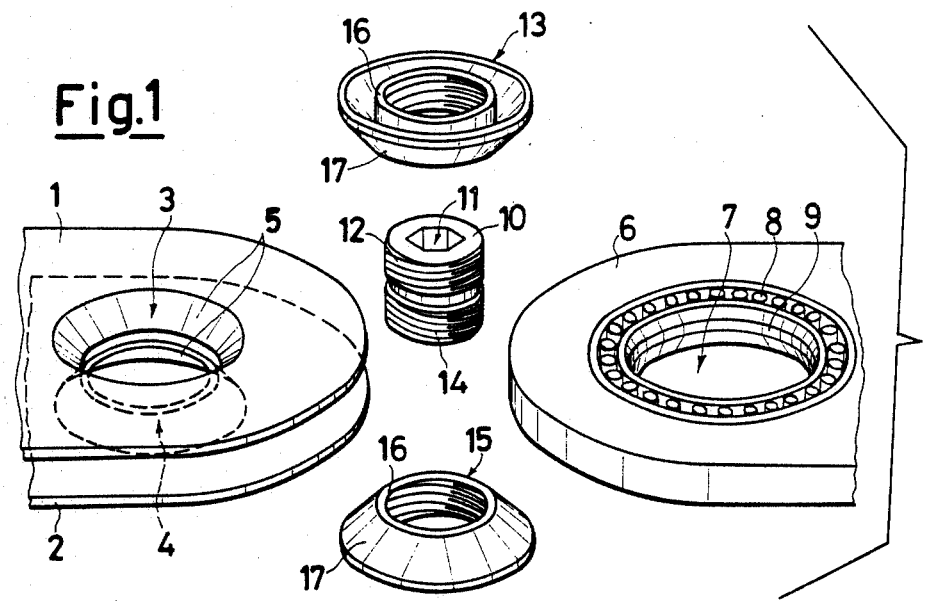
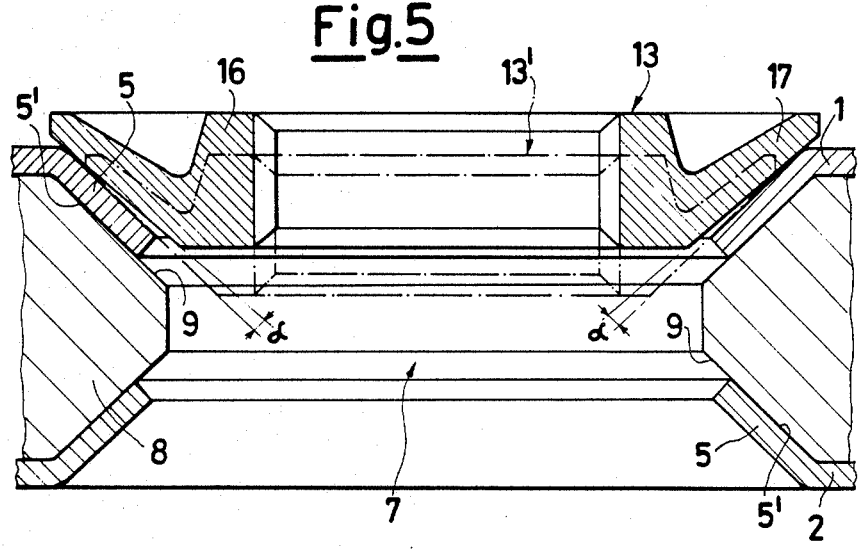

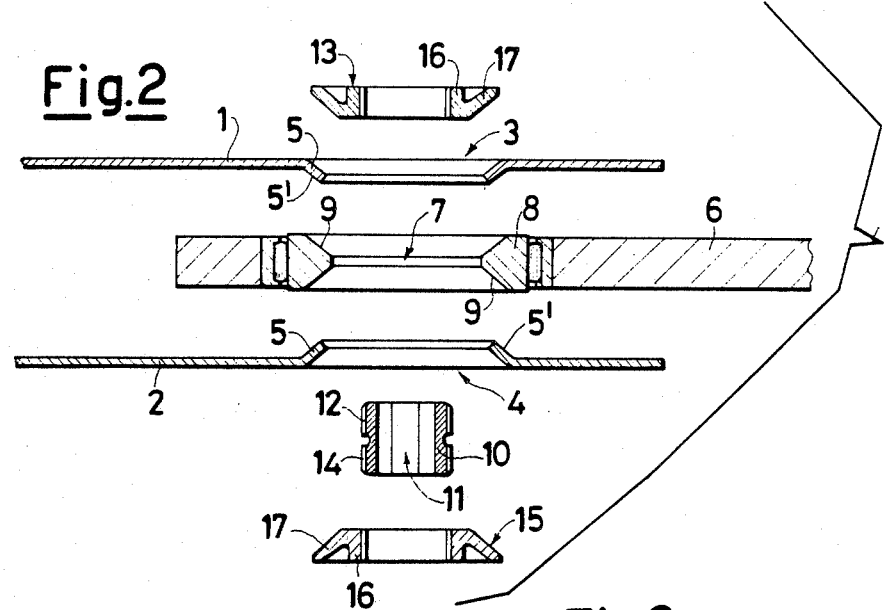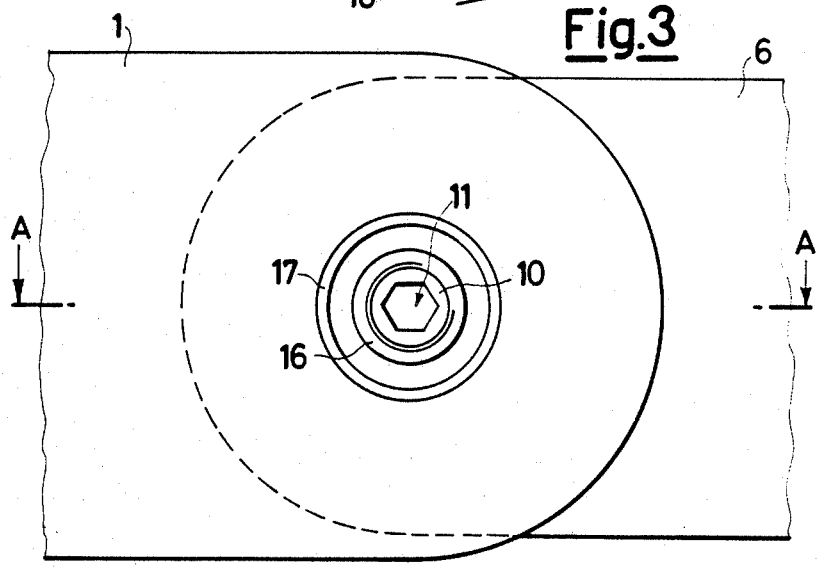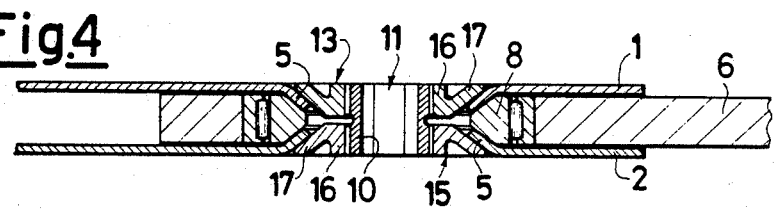

DEMOUNTABLE PIN, PARTICULARLY SUITABLE FOR THE LEVER MECHANISMS OF TEXTILE MACHINES

This invention relates to a new type of demountable pin, which is constructionally simple and economical and able to support large alternating loads without any danger of slackening by virtue of being self-locking, it requiring only a small tightening torque and can be demounted and remounted an indefinite number of times as it provides no permanent deformation or impression on the contacting surfaces.

As the pin according to the invention can be formed with a very small axial dimension, it is particularly suitable for the lever mechanisms of textile machines.

In this respect, in modern looms it is well known that the heddle frames are raised and lowered by trains of adjacent lever mechanisms which, for reasons of standardisation, have an axial pitch which is generally of 12 millimeters.

The requirement for ever increasing loom speeds makes it necessary to construct pins having axial dimensions not exceeding 12 mm, but which are able to support increasingly large alternating loads with absolute security against slackening and thus able to store an adequate and sufficient elastic energy during their tightening.

Various types of pin, some of which are demountable, are known in the current state of the art. One of said known demountable pins consists of a screw with a frusto-conical head underside and having an internal hexagonal bore for its tightening by a key, and a nut also provided with a frusto-conical head underside. The two frusto-conical head undersides of the screw and nut engage two frusto-conical flares press-formed in one end of each of two opposing plate metal cheeks forming a first element, between which an end of a second element to be rotatably connected is inserted, and which for this purpose comprises in correspondence with the screw passage bore a bearing or bush. This and all other known concepts have however a series of drawbacks which are magnified when the pin has to remain dimensionally contained within a small axial length of the order of 12 mm. Of these drawbacks, the worst is without doubt the fact that because of the small squat dimensions of the pin, it cannot be made to deform appreciably to store a sufficient amount of elastic energy to secure against slackening of the connection when large alternating loads are present.

On the other hand the nut, which is completely embedded in the respective flare, has no possibility of remaining gripped while the system is being tightened (during any tightening procedure the nut is generally held with a wrench so that it does not rotate) so that in order to prevent the nut rotating, its frusto-conical head underside is generally provided with knurling disposed along the generating lines of the cone frustum to engage the frusto-conical flare of the plate metal cheek and thus prevent the nut rotating. However, this knurling bites into the said flare as the system is tightened, to mark it irreversibly with a permanent deformation which with the passage of time worsens the connection and therefore does not allow indefinite tightening and untightening of the pin.

Moreover, during tightening, the frusto-conical underside of the screw head rotates and slides against the respective cheek flare to create burnishing or scoring which deteriorates said flare. As the said sliding underside of the head has a diameter which is more than double the diameter of the screw thread, the result is that during tightening, that friction torque which is generated in the sliding zone and which has to be overcome by the torque key for tightening purposes is approximately double the uneliminable torque which originates from the screw thread friction alone.

The object of the present invention is to obviate the aforesaid drawbacks by providing a demountable pin of simple and economical construction which is able to store a considerable amount of elastic energy while being contained within very small axial dimensions, and which undergoes no slippage of any sort during tightening.

This is attained substantially by providing the pin with a central stay bolt having an internal hexagonal through bore for its tightening by a key, and comprising in correspondence with its two ends two external opposite-handed threads, namely right handed and left handed respectively, which cooperate with corresponding threads provided in two identically shaped end nuts.

In this manner, once the nuts have been engaged in the respective frusto-conical flares of the two cheeks, on continuing to rotate the central stay bolt they compress the two cheeks without any relative tangential movement occurring between the nuts and flares and thus without any sliding or slippage between the contacting parts, and consequently without any permanent deformation occurring which could damage the connection in the course of time. The pin can therefore by mounted and demounted an indefinite number of times without any problem, given that it leaves no trace on the corresponding tightened zones.

Again, the said characteristic of no slippage arising between the nuts and flares during tightening leads to the further fundamental advantage of reducing to approximately one half, with respect to the state of the art, the torque necessary to obtain a given axial load on the pin as the only torque now to be overcome is that due to the thread friction.

The pin formed in this manner also has the advantage of being able to be tightened and untightened on either side, and moreover as its two nuts have the same identical shape said nuts can be obtained from the same pressing with consequent evident economic advantage.

Finally, in order to be able to store a considerable amount of elastic energy in the pin and given that the central hollow stay bolt can obviously not be appreciably deformed, the required considerable deformation is obtained not in the stay bolt itself but in the two end nuts which for this purpose have a particular and original shape.

More specifically, the two end nuts of high-strength pressed steel each have a structure consisting of an internally threaded, substantially cylindrical annular part which is provided externally, at one end, with an annular flange having a frusto-conical surface and a thickness which decreases in an outward direction, its taper being greater by a few degrees than the taper of the corresponding frusto-conical flare of the cheek. In this manner, the nut has a very elastic flexible flange which by having a greater taper than the frusto-conical flare of the cheek into which it is to be inserted is compelled to bend during tightening until it perfectly mates with the frusto-conical edge of said flare to thus undergo elastic deformation and store energy. Tests carried out have shown that even for very small axial dimensions of the order of 12 millimeters, pins constructed in this manner are able to withstand alternating loads of some thousands of kilograms indefinitely, i.e. loads of an order of magnitude greater than that heretofore attained, without slackening occurring in the connection.

Thus, the demountable pin to be inserted and clamped between two frusto-conical flares formed by pressing in one end of each of two opposing plate metal cheeks forming a first element and between which there is inserted an end of a second element to be rotatably connected thereto and which for this purpose comprises a bearing in correspondence with the pin passage bore, is characterised according to the present invention by consisting of a central stay bolt having an internal hexagonal through bore for its tightening by a key, and comprising in correspondence with its two ends two opposite-handed threads, right handed and left handed respectively, which are arranged to cooperate with the corresponding inner threads provided in two end nuts each of identical structure consisting of an internally threaded, substantially cylindrical annular part which is provided externally, at one end, with an annular flange having a frusto-conical surface and a thickness which decreases in an outward direction, its taper being greater than the taper of said frusto-conical flares of the cheeks forming said first element.

The invention is described in detail hereinafter with reference to the accompanying drawings which show a preferred embodiment thereof by way of non-limiting example in that technical, applicational or constructional modifications can be made thereto but without leaving the scope of the present invention. In this respect, it is apparent that the demountable pin is not only limited to connecting a facing-cheek element to another element, but can be applied in any field, from structural steel work to linkage work, in which large loads have to be withstood without the danger of slackening.

In said drawings:

FIG. 1 is an exploded perspective view of the demountable pin according to the invention, used for rotatably connecting two elements together, one of which comprises two opposing cheeks;

FIG. 2 is a sectional view of the system of FIG. 1 in a position ready for assembly;

FIG. 3 is a view from above of the system of FIG. 2 already assembled;

FIG. 4 is a section on the line AA of FIG. 3;

FIG. 5 is a section through a detail of FIG. 4 to an enlarged scale, showing the elastic deformation of the nut.

In the figures, the reference numerals 1 and 2 indicate respectively the ends of two opposing plate metal cheeks pertaining to a first element and comprising two flares 3, 4, respectively, formed by pressing and having frusto-conical surfaces 5.

Between said cheeks 1 and 2 there is inserted the end of a second element 6 which is to be rotatably connected thereto and comprises in an appropriate hole 7 a roller bearing 8 having an inner track 9 with a double frusto-conical surface so as to exactly mate with the outer faces 5' of the frusto-conical projections 5 of the flares 3 and 4.

The two elements 1-2 and 6 are clamped together by a pin passing through the holes 3, 4 and 7 and consisting of a central stay bolt 10 having in its interior a hexagonal through bore 11 which enables it to be rotated from both ends by a key, and on its exterior a right handed thread 12, as has the end nut 13, and a left handed thread 14, as has the end nut 15.

The two said end nuts 13 and 15 are substantially identical and are each formed of a cylindrical annular part 16 comprising said thread internally and provided at its outer end with an annular flange 17 having a frusto-conical surface and a thickness which decreases in an outward direction (see FIG. 5 specifically). As can be clearly seen in FIG. 5, said annular flange 17 of the nuts 13 and 15 has a taper which exceeds by a certain angle $\alpha$ that of the inner frusto-conical surface 5 of the flares 3 and 4, so that during tightening, said flange is compelled to bend through an equal angle $\alpha$, of about $2 \div 3$ degrees, to thus deform elastically and displace said frusto-conical surface 5, to reach the final position shown by dashed lines in the figure and indicated by 13'.

I claim:

1. A demountable pin for insertion between and clamping together two frusto-conical flares sandwiching an element containing an annular bearing consisting of a central stay bolt having an internal hexagonal through bore and defining left and right-handed threads on either end of said stay bolt and two internally threaded end nuts for complementarily threading on the threads of said stay bolt, each said end nut consisting of an internally threaded cylindrical annular part and an elastic external annular flange at one end of said cylindrical annular part, said annular flange having inner and outer conical surfaces with different tapers so that the distance between the inner and outer annular frutoconical surfaces decreases in an outward direction, said end nuts upon assemblage having said annular frustoconical outer surfaces of each nut extending away from each other.

2. A demountable pin as claimed in claim 1, wherein said end nuts are constructed of high-strength pressed steel.

3. A demountable pin as claimed in claim 1, wherein said taper of said outer conical surface may flex by $2 \div 3$ degrees.

* * * * *